INVENTOR.
MILTON STOLL

FIG. 2

INVENTOR.
MILTON STOLL
BY
Lachenbach & Siegel
ATTORNEYS

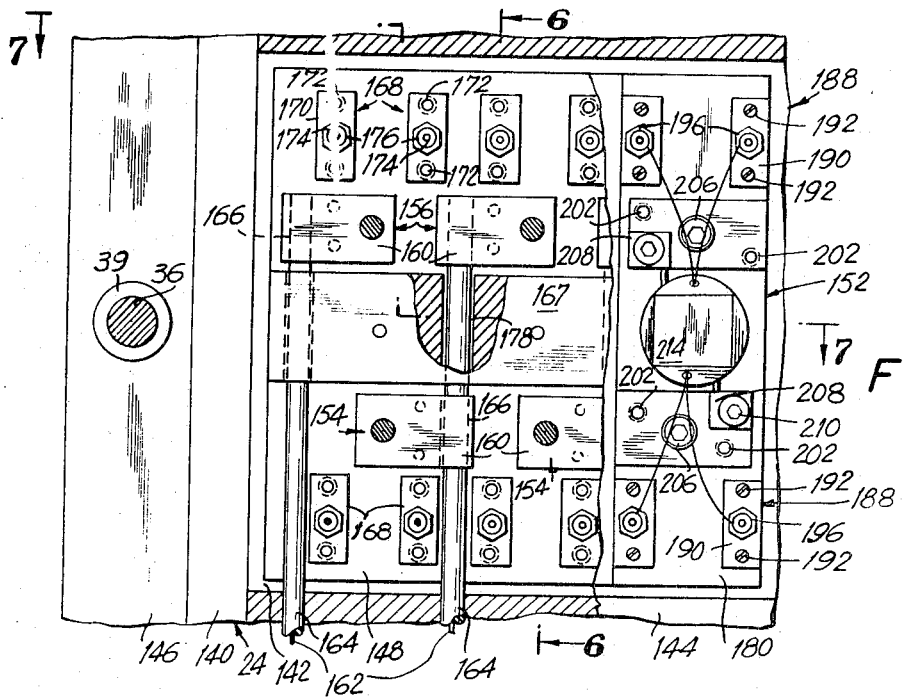
FIG. 5
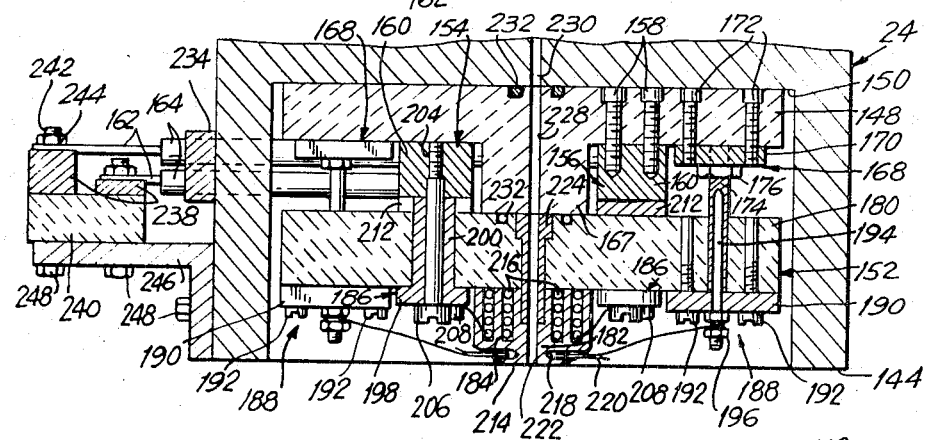
FIG. 6
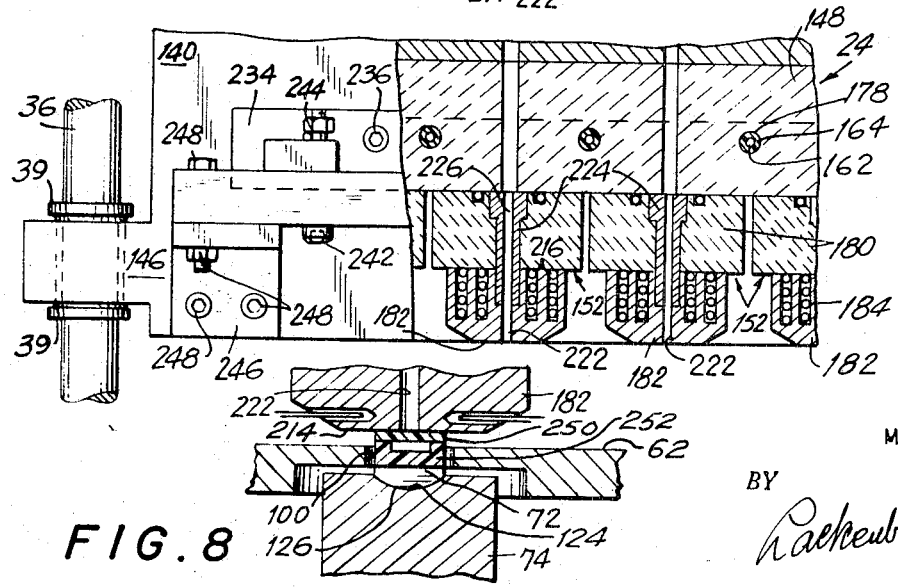
FIG. 7
FIG. 8
INVENTOR.
MILTON STOLL
BY Rackenbach & Siegel
ATTORNEYS

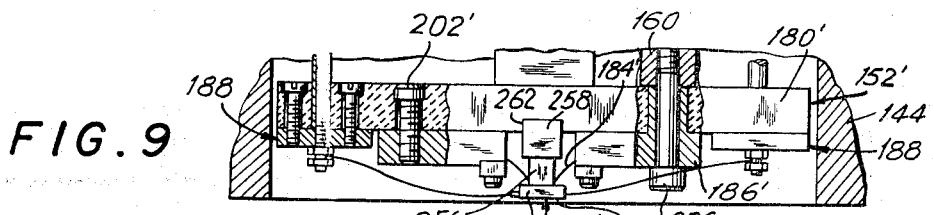
FIG. 9
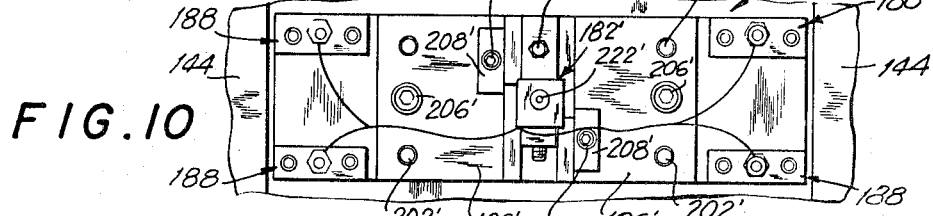
FIG. 10
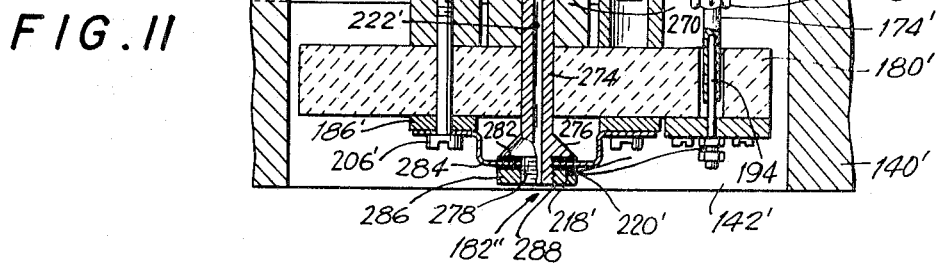
FIG. 11
FIG. 12 FIG. 14
FIG. 13 FIG. 15
INVENTOR.
MILTON STOLL
BY
Rackenbach & Siegel
ATTORNEYS INVENTOR.
MILTON STOLL
BY
Pachenbach & Siegel
ATTORNEYS United States Patent Office 3,551,127
Patented Dec. 29, 1970

3,551,127
METHODS, APPARATUS AND SYSTEMS FOR HEAT SEALING ELECTRICAL DEVICES WITHIN FLAT GLASS PACKAGES
Milton Stoll, New York, N.Y.
(14—19 212th St., Bayside, N.Y. 11360)
Continuation-in-part of applications Ser. No. 558,142, June 16, 1966, and Ser. No. 642,627, May 4, 1967. This application July 11, 1967, Ser. No. 656,622
Int. Cl. C03b 29/00; C03c 27/00
U.S. Cl. 65—32                                                  25 Claims

ABSTRACT OF THE DISCLOSURE

Methods, apparatus and systems for the treatment of work pieces, particularly for the heat sealing of packages, such as flat glass packages utilized to enclose electrical devices, by presenting repeatable and reproducible profiles of temperature generally uniformly across the cover side of the package with heater means comprising at least a high diffusivity layer operatively associated with a heat sink and a feedback temperature profile controller; and presenting repeatable and reproducible heat transfer conditions to the circuit side of the package with a spring-biased, self-adjusting nest operatively associated with a heat sink, the temperature profile preferably comprising a controlled temperature rise, a controlled dwell at sealing temperature, and a controlled anneal during cooling off.

---

This application is a continuation-in-part application of applicant's co-pending applications Ser. No. 558,142 filed on June 16, 1966 entitled Methods, Apparatus and Systems for Producing Enclosed Devices, now Pat. No. 3,490,886 and Ser. No. 642,627 filed on or about May 4, 1967 entitled Temperature Controllers Employing Closed Loop Feedback and Incremental Programming, now Pat. No. 3,479,487.

This invention relates generally to methods, apparatus and systems for the treatment of work pieces, such as the heat sealing of glass packages. More particularly, this invention relates to methods, apparatus and systems for positioning such work pieces for treatment and for automatically controlling the treatment and the conditions existing during such treatments.

In applicant's co-pending parent application Ser. No. 558,142, there are disclosed methods, apparatus and systems for producing enclosed devices, such as glass enclosed semiconductor devices by mechanical positioning thereof, followed by a predetermined pattern of heat and fluid pressure application. The methods, apparatus and systems disclosed in the above-identified parent application enable the production of a plurality of such devices rapidly and simultaneously by means of a plurality of work stations disposed beneath a movable bell jar structure and program control means for controlling the movement of the bell jar, physical manipulation of the individual work stations and control of the atmosphere within the bell jar and the application of energy to heaters at each work station. The heating devices of the previous apparatus are of generally annular configuration, with the device to be sealed being positioned generally centrally thereof to enable the formation of a generally annular seal. In the production of sealed devices of the type generally referred to as "flat-packs," it is necessary to provide a seal between a generally flat cover and the adjoining plurality of upstanding walls. If such a flat-pack were to be positioned within the generally annular heating coils of the apparatus disclosed in the above-identified parent application, excessive heating of the flat-pack and of the components therein would occur during the sealing operation. Moreover, since a "flat-pack" is fabricated of very thin and relatively wide glass panels, it is very important that such sealing operation be accomplished with a minimum of stressing of the glass.

"Flat-pack" sealing is superficially simple. For example, a "flat-pack" may be sealed by merely heating the lid until the glass frit softens, or the pre-form braises. However, where it is necessary to control the atmosphere within the package to provide a specified gas or gas mixture at a specified pressure, and where the device to be sealed within the package is temperature sensitive, then the superficially simple sealing operation becomes quite complex. While a glass package, by itself, can be sealed quite adequately in a furnace, the formation of a proper seal requires a quite discreet profile of temperature. While the requirements for this profile have been at least partially established in the literature, heretofore available equipment cannot provide a feedback controlled temperature profile corresponding to the desired profile, because of the short time cycle and the large number of cycles that the equipment would have to be capable of from a mechanical standpoint. Moreover, the cost of previously existing profiling equipment is very high and economically prohibitive for individually controlling a plurality of sealing stations. Furthermore, previous attempts to provide proper annealing of glass packages resulted in excessive heating of the components or devices to be sealed therein and, accordingly, excessive damage thereof, especially where the device or component comprised semi-conductor materials.

While it is true that where a metal to metal seal is to be produced, such as by the use of solders or braising materials, the time factor becomes of secondary importance, as these seals are not subject to the same type of internal stressing, the capability of a controlled heat source to bring the "flat-pack" lid to a temperature at which the sealing materials fuse or solder or coalesce without excessively heating the device or component is still of substantial importance. Hence, a controlled heat source as utilized in the present invention can be advantageously used for universally sealing the lids of all "flat-packs." Additionally, at least one previous sealing practice applies the heat to the bottom of the "flat-pack" and the internal convection currents therein tend to overheat the device or components.

Ideally, a proper sealing of a glass package is dependent upon or related to two basic temperature-time conditions, namely, programming or profile and gradient. Programming or profile is important in providing a properly annealed seal and gradient is important in protecting the packaged components from overheating and to protect the package itself from thermal stressing. Of course, both of these factors are interrelated and are not entirely separate, changes in one effecting changes in the other.

A second major problem in effective, efficient sealing of "flat-packs" is the mechanical problem caused by variations in the "flat-pack" dimensions, variations in the amount of frit or solder, and the tremendous proliferation of packages. Heretofore known sealing equipment required extensive fixturing and individual set up to enable the sealing of different "flat-packs" with the same equipment and users thereof have encountered many difficulties in compensating for variations between normally similar packages.

Accordingly, it is a primary object of the present invention to provide methods, apparatus and systems for the treatment of units or components, such as the heat sealing of glass packages.

Another primary object of the present invention, in addition to the foregoing object, is to provide such methods, apparatus and systems which provide such treatment with a minimum of adverse effects.

Another primary object of the present invention, in addition to each of the foregoing objects, is to provide such methods, apparatus and systems particularly adapted to heat seal the flat-pack glass packages.

A further primary object of the present invention, in addition to each of the foregoing objects, is to provide such methods, apparatus and systems having feedback control of the temperature and temperature profile of the sealing process.

Another and still further primary object of the present invention, in addition to each of the foregoing objects, is to provide methods, apparatus and systems for the feedback control of a temperature profile of a heat sealing process.

A further primary object of the present invention, in addition to each of the foregoing objects, is to provide equipment, apparatus and systems which can be used for universally sealing lids of substantially all flat-packs.

A still further primary object of the present invention, in addition to each of the foregoing objects, is to provide such equipment, apparatus and systems having a controlled heat source.

Still another primary object of the present invention in addition to each of the foregoing objects, is to provide such equipment, apparatus and systems capable of profiling the heating of such packages, that is, the rate of heating up, the time for dwell and the rate of cooling off.

It is also a primary object of the present invention, in addition to each of the foregoing objects, to provide equipment, apparatus and systems for heating a flat-pack from above to take advantage of the static cold level at the bottom thereof to reduce excessive heating of the components or devices enclosed therein.

An additional primary object of the present invention, in addition to each of the foregoing objects, is to provide such equipment, apparatus and systems which can be readily modified to accommodate substantially any size, shape or variety of flat-packs and even to accommodate flat-packs of divergent sizes simultaneously.

A still further primary object of the present invention, in addition to each of the foregoing objects, is to provide such equipment, apparatus and systems having a nest which is self-aligning and is loaded vertically to a predetermined pressure for the package during sealing.

Another primary object of the present invention, in addition to each of the foregoing objects is to provide methods, apparatus and systems for sealing flat packages within atmospherically controlled chamber means.

Still another primary object of the present invention, in addition to each of the foregoing objects, is to separable chamber defining means and means for operating such chamber defining means simply, economically, rapidly, and accurately.

A still further primary object of the present invention, in addition to each of the foregoing objects, is to provide methods, apparatus and systems for thoroughly flushing and/or evacuating flat packages prior to sealing thereof.

Yet another primary object of the present invention, in addition to each of the foregoing objects is the provision of methods, apparatus and systems for post pressurizing flat packages during the sealing thereof.

Another and still further primary object of the present invention, in addition to each of the foregoing objects, is to provide methods, apparatus and systems for sealing flat packages by providing a uniform programmable and repeatable temperature condition to the lid or cover thereof.

Yet still another primary object of the present invention, in addition to each of the foregoing objects, is to provide methods, apparatus and systems for disposing a high thermal diffusivity heater element having a uniform temperature gradient in contact with a cover or lid of a flat-pack for sealing the flat-pack.

It is also a primary object of the present invention, in addition to each of the foregoing objects, to provide methods, apparatus and systems for sealing flat-packs by exposing the flat-pack to a uniform, programmable controllable and repeatable set of temperature conditions.

It is also a primary object of the present invention, in addition to each of the foregoing objects, to provide methods, apparatus and systems for sealing flat packages by exposing the lid or cover to a uniform and controllable temperature heat source.

A further primary object of the present invention, in addition to each of the foregoing objects, is to provide methods, apparatus and systems for sealing flat packages by positioning the packages in contact with heater means thermally associated with a heat drain or sink, enabling the heater and package temperature to be rapidly and accurately fully controlled during all portions of the sealing cycle.

A yet further primary object of the present invention in addition to each of the foregoing objects, is the provision of methods, apparatus and systems for sealing flat packages by contact with heater means characterized by high thermal diffusivity and rapid thermal response.

It is a yet further primary object of the present invention, in addition to each of the foregoing objects, to provide methods, apparatus and systems for sealing flat packages by quickly sealing the cover at a predetermined temperature while maintaining the contained parts at a substantially lower predetermined temperature and below the temperature capable of damaging such parts.

Another and yet still further primary object of the present invention, in addition to each of the foregoing objects, is to provide methods and apparatus for producing an annealed and stress-free glass package within an atmospherically controlled chamber.

A still further primary object of the present invention, in addition to each of the foregoing objects, is to provide methods, apparatus and systems for sealing a plurality of flat packages simultaneously within an atmospherically controlled chamber by exposure to reproducible and repeatable temperature conditions.

Yet another primary object of the present invention, in addition to each of the foregoing objects, is to provide apparatus and systems for sealing flat packages by applying heat from above wherein an upper assembly comprises heater and atmosphere control means, the upper assembly being spacially fixed for cooperation with a lower assembly movable relative thereto having thermally controlled nest means together with in-line moving means therefor.

Yet another and still further primary object of the present invention, in addition to each of the foregoing objects, is the provision of a thermal gradient flat-pack sealer having heater means disposed within and atmospherically controlled chamber, heat sink means, and programmed feedback control for the heater means.

A still further object of the present invention, in addition to each of the foregoing objects, is to provide apparatus of the class described adapted for partial or complete dry box operation.

Another primary object of the present invention, in addition to each of the foregoing objects, is the provision of methods, apparatus and systems for sealing flat-packs by positioning the flat-packs between a heater and a heat sink in a controlled atmosphere with feedback control of the heater.

It is a feature of the present invention that the glass flat-pack packages may be heat sealed by the application of heat to the top thereof.

It is another feature of the present invention that the heating and temperature measuring components may be disposed in a fixed position, with a bell-jar type structure being disposed below and adapted to be raised to a closed position.

It is a further feature of the present invention that the equipment, apparatus or systems thereof allows for wide variations or selections of gas or atmosphere cycling involving evacuation, flushing, pressurization and post-pressurization.

Other objects and important features of the present invention will be apparent from a study of the specification following taken with the drawings, which together describe, disclose, illustrate and show at least one preferred embodiment or modification of the present invention and what is now considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawings:

FIG. 2 is an enlarged partial plan view taken along line 2—2 of FIG. 1;

FIG. 5 is an enlarged bottom partial cross sectional plan view taken along line 5—5 of FIG. 1;

FIG. 6 is a side elevational cross sectional view taken along line 6—6 of FIG. 5;

FIG. 7 is a cross sectional elevational view taken along line 7—7 of FIG. 5;

FIG. 8 is an enlarged elevational cross sectional view illustrating the assembled position of the package within the apparatus;

FIG. 9 is a partial side elevational, partial cross sectional view similar to FIG. 6 illustrating another embodiment or modification of the upper assembly in accordance with the principles of the present invention;

FIG. 10 is a partial plan view looking up into the upper assembly shown in FIG. 9;

FIG. 11 is a partial side elevational cross sectional view similar to FIG. 6 illustrating yet another embodiment or modification of upper assembly constructed in accordance with the principles of the present invention;

FIG. 12 is a partial elevational view of the heater and terminal block similar to that shown in FIG. 11;

FIG. 13 is a plan view looking up at the heater and terminal block of FIG. 12;

FIG. 14 is a view similar to FIG. 12 illustrating another embodiment or modification of heater and terminal block according to the present invention;

FIG. 15 is a partial plan view looking up at the heater and terminal block of FIG. 14;

Figure 1:
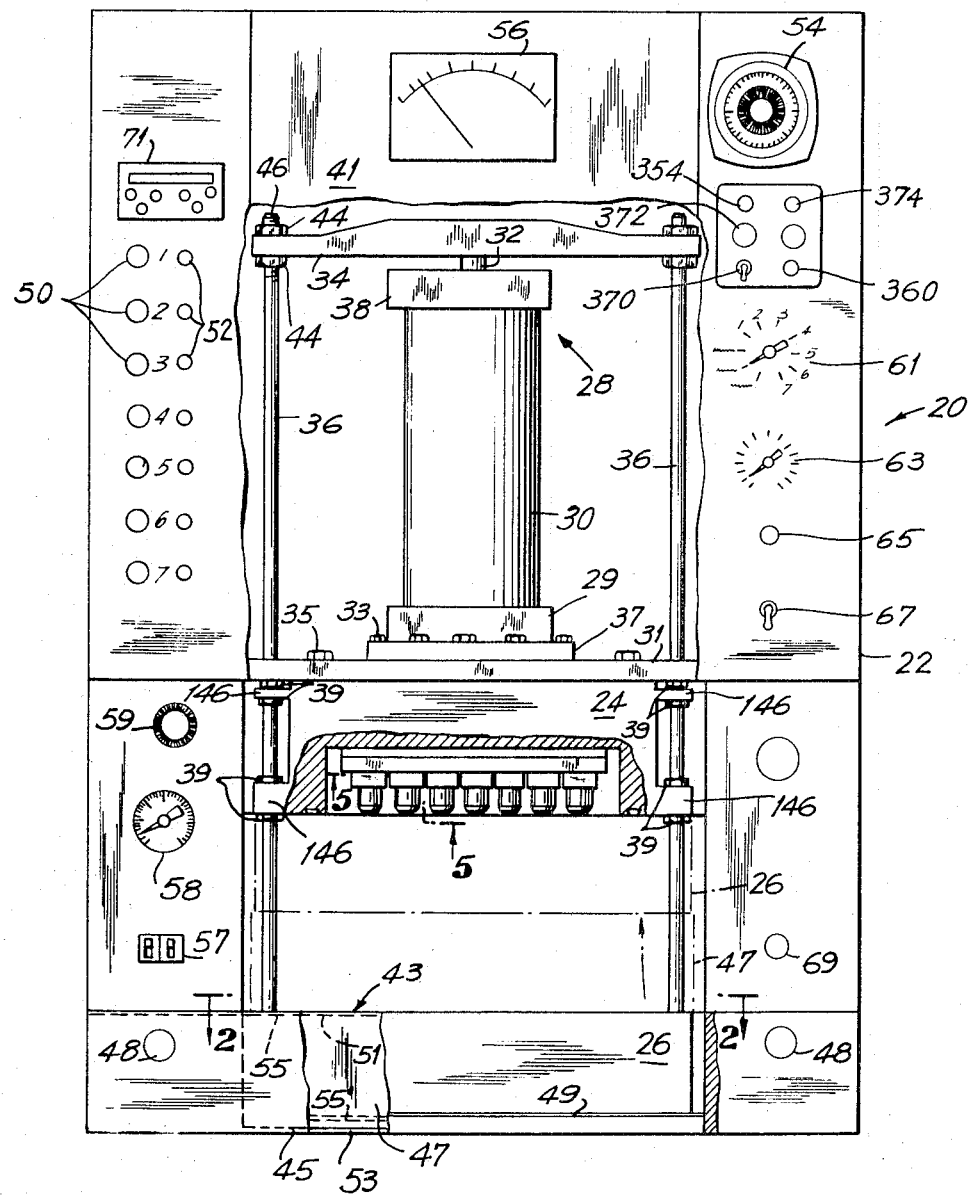
FIG. 1 is a front elevational view, partially in section of apparatus constructed in accordance with the principles of the present invention.

With reference now to the drawing, and particularly to FIG. 1 thereof, there is shown an illustrated a seven-station sealing machine constructed in accordance with the principles of the present invention and designated generally by the reference character 20.

While the machine or apparatus 20 is shown and illustrated as comprising seven sealing stations mounted in a single cabinet with the various controls and indicators therefor, it is to be understood that this particular machine or apparatus 20 is shown and illustrated for exemplary purposes only, and the present invention is not to be deemed limited thereby. It is to be expressly understood that a machine or apparatus constructed in accordance with the principles of the present invention may comprise more or less than seven work stations and, furthermore, the machine or apparatus may comprise a plurality of physically separated work stations or work station assemblies, each work station assembly comprising one or more work stations physically separated from the control and monitoring equipment therefor.

While the machine or apparatus 20 is shown, illustrated and hereinafter described as being provided with separate heaters structurally associated with the upper assembly for each of the work stations, it is to be expressly understood that the heaters may be disassociated from the upper assembly and that each heater may be utilized to seal one or a plurality of flat packages. Furthermore, a common heater may be utilized for a plurality of work stations or flat packages having a single heater element for heating all parts of the heater or a plurality of heater elements independently or commonly controlled for heating portions of such a common heater.

The machine or apparatus 20 comprises a cabinet or housing 22, an upper heater block assembly 24 structurally associated therewith in generally fixed position relative thereto and a lower block assembly 26 disposed beneath the upper heater block assembly 24 and movable between a loading position illustrated in solid lines in FIG. 1 whereat the lower block assembly 26 is spaced apart from the upper block assembly 24 and a sealing position illustrated in phantom in FIG. 1 whereat the lower block assembly 26 is disposed subjacent the upper heating block assembly 24. Moving means, such as at least one pneumatic cylinder 30 having a piston rod 32 pneumatically extendable therefrom is provided to move the lower block assembly 26 between the loading and sealing positions thereof, as by means of a lifting frame 34 structurally associated with the piston rod 32 and tie rods 36 structurally associated with the lifting frame 34 and the lower block assembly 26.

For example, the lower end cap 29 of the air cylinder 30 and the upper block assembly 24 may be structurally associated on the upper and lower surfaces, respectively, of a frame member 31 structurally associated with the housing or cabinet 22 by means, not shown. Threaded fasteners, or the like, 33 and 35 may be utilized to secure the lower end cap 29, as by passing through apertures, not shown, provided extending through a flange portion 37 comprising a portion of the lower end cap 29 and the upper block assembly 24 by extending through apertures, not shown, provided in the frame member 31, respectively, with the frame member 31.

The piston rod 32, as heretofore pointed out, is slidable relative to the air cylinder 30 and extendable outwardly thereof through an apertured or annular end cap 38. The lifting frame 34 may, for example, be structurally associated with the outward end portion of the piston rod 32 in any desired manner, as by means of a screw thread connection, or the like. The lower end portion of the tie rods 36 may be structurally associated with the lower block 26 in any desired manner, as by means of screw threaded end portions 40 engaged within threaded bores 42 (see FIG. 3) and the upper end portions of the tie rods 36 may be structurally associated with the lifting frame 34 in any desired manner, such as by means of a plurality of internally threaded nuts 44 engaged with screw threaded portions 46 provided on the upper end portions of the tie rods 36. Bearing means, such as sleeve bearings 39 may be provided in the frame member 31 and upper block assembly 24 to enable guided movement of the tie rods 36 relative thereto.

Accordingly, upon the admission of a fluid, such as high pressure air, nitrogen, or the like, to the cylinder 30 beneath the piston portion of the piston rod 32, the piston rod 32 will be moved generally outwardly of the cylinder 30, moving the lifting frame 34, tie rods 36 and lower block assembly 26 upwardly until the lower block assembly 26 is in the sealing position thereof subjacent the upper block assembly 24. When the lower block assembly 26 engages the upper block assembly 24, that is, when the lower block assembly 26 is disposed in the sealing position, and tightly against the upper block 24, the pressure within the cylinder 30 will rise to a valve sufficient to seal the upper and lower chamber and to overcome gas pressures therebetween, enabling a pressure-responsive switch, or the like, to indicate such closure and sealing and initiate further operation of the apparatus.

The upper block assembly 24 comprises the active portion of the chamber, defining portions, that is, carries the heater leads, feedback control wiring, gas conduits for atmospherically controlling the chamber and coolant passages for cooling the upper assembly and for increasing the heat drain from the heater sufficiently to enable the temperatures thereof to be fully controlled by the energy input thereto.

The lower assembly, however, is predominantly passive, having no heater leads, feedback wiring or gas conduits associated therewith. Hence, it is preferable to have the lower or passive assembly the moving assembly, enabling the active or upper assembly to remain stationary, as shown, to preclude flexing, etc. of the wires, leads and conduits, and possible subsequent damage thereto.

The relative configuration and arrangement of the upper assembly, lower assembly and moving means, in addition to substantially connector flexing, also produces an extremely rigid arrangement at low cost, further enabling accurate alignment and sealing of the assemblies, even under high gas pressures.

Some previously suggested arrangement for sealing machines required the use of a C shaped frame, the upper and lower assemblies defining the arms thereof. Such an arrangement produces high bending moments, especially under high chamber pressures, necessitating an extremely heavy frame.

In the present invention, since the upper block assembly, lower block assembly and moving means are all in a common plane, no bending moments are created which would tend to create mis-alignments of the assemblies, eliminating the necessity for a heavy and rigid C frame.

Moreover, since the work area is essentially open and unobstructed, a dry box, or the like, may be inexpensively and readily provided, if desired.

The housing or cabinet 22 comprises a front panel portion 41 which encloses the cylinder 30, lifting frame 34 and the upper end portions of the tie rods 36 to, inter alia, prevent an operator from contact with the moving parts. Preferably, the housing or cabinet assembly 22 further comprises a guard structure 43 movable with the lower block assembly 26 to preclude an operator's hands from entering beneath the lower block assembly 26. For example, the guard structure 43 may comprise a fixed panel member 45 extending transversely across the front of the machine or apparatus 20 and having substantially the same height as the height of the lower block assembly 26. The guard structure 43 may further comprise a generally C shaped movable panel member 47 disposed between the fixed panel member 45 and the lower block assembly 26 and movable in a generally vertical plane in response to movement of the lower block assembly 26. For example, the lower block assembly 26 may be provided with a forwardly extending lifting flange 49 adapted to engage a generally rearwardly extending flange portion 51 extending inwardly from the upper edge portion of the movable panel member 47 to lift the movable panel member 47 upon upward movement of the lower block assembly 26. The lower edge portion of the movable panel member 47 may be further provided with an outwardly or forwardly extending flange portion 53 adapted to be disposed subjacent an inwardly or rearwardly extending flange portion 55 of the fixed panel member 45 when the movable panel member 47 is in the upward position thereof. The movable panel member 47 is preferably further provided with an inwardly or rearwardly extending flange portion 55 adapted to be engaged by the lower surface of the lifting flange 49 as the lower block assembly 26 mmoves downwardly to the loading position thereof to positively return the movable panel member 47 to the lower position thereof. A tie strip 41 may also be provided, extending along the lower rear to provide structural integrating to the movable panel 47.

The housing or cabinet 22 of the apparatus or machine 20 is further provided with operating and monitoring controls and indicators, such as a pair of cycle start buttons 48 preferably disposed at spaced apart locations to require both hands of an operator to be clear of the space between the upper block assembly 24 and the lower block assembly 26 during closure thereof, a main power switch 57, individual proportioning controls and heater power on indicating lamps 50 and 52, respectively, for each of the work stations, a chamber pressure gauge 58, a cycle "on" indicator 59, a dwell timer 54, a temperature monitoring meter 56 adapted to be connected with monitoring thermocouples at each of the work stations and to monitor and adjust the programmed temperature profile signal by means of a multiple position switch 61, a low temperature set control 63, a temperature range control 65, a cover vacuum control switch 67, a control circuit fuse 69 and a test panel 71.

Figure 2:
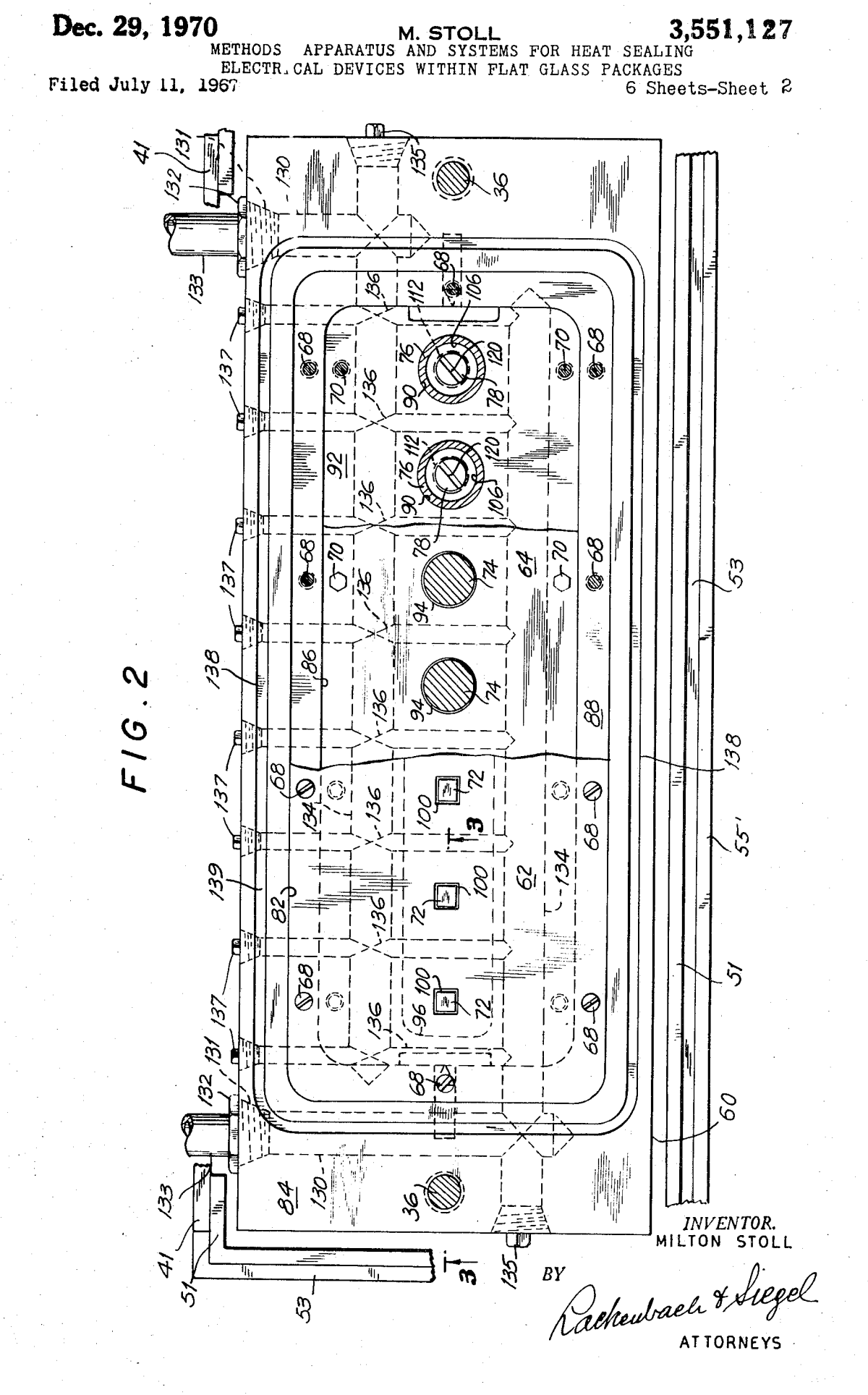
Figure 3:
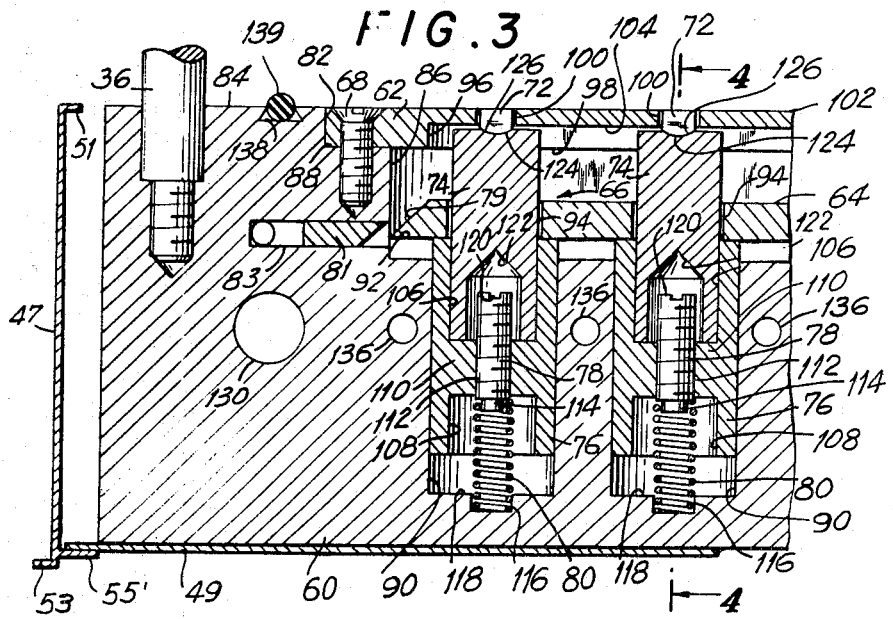
FIG. 3 is an enlarged partial front elevational cross sectional view taken along line 3—3 of FIG. 2.
Figure 4:
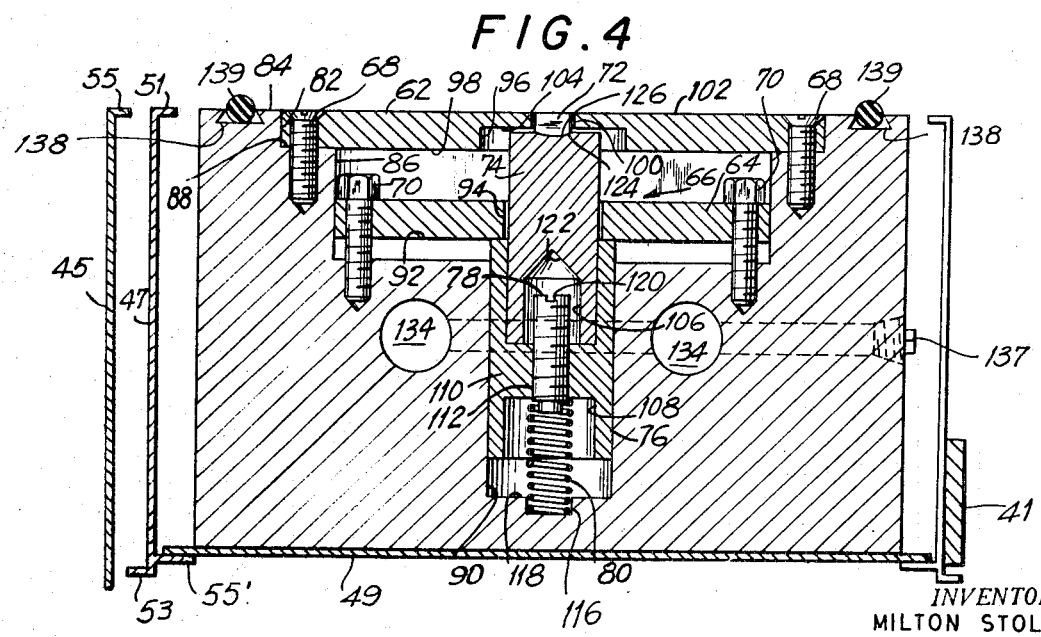
FIG. 4 is a side elevational cross sectional view taken along line 4—4 of FIG. 3.

With reference now to FIGS. 2, 3 and 4, the lower block assembly 26 comprises a base block 60, a top plate 62, an intermediate plate 64, and a plurality of nest assemblies 66, one for each work station. The top plate 62 and the intermediate plate 64 are secured with the base block 60, preferably removably, as by means of a plurality of threaded fasteners, such as screws 68 and 70, respectively.

Each of the nest assemblies 66 comprises a nest 72, a nest seat 74, a guide 76, an adjusting screw 78, and a spring 80.

The base block 60 is of generally rectangular configuration provided with a generally rectangular recess 82 extending generally inwardly of the top surface 84 thereof and adapted to have the top plate 62 flush positioned therein. A second recess 86 is provided extending inwardly of the bottom surface 88 of the recess 82 adapted to receive therewithin the intermediate plate 64, which is likewise of generally rectangular configuration and of slightly lesser lateral dimensional extent than the top plate 62. The recess 86 is of somewhat greater depth than the thickness of the intermediate plate 64, so that the top plate 62 and the intermediate plate 64 will be disposed in generally spaced apart relationship. A plurality of generally cylindrical recesses or bores 90, one for each work station of the apparatus, are provided extending generally downwardly of the bottom surface 92 of the recess 86. The intermediate plate 64 is provided with a plurality of generally circular apertures 94 adapted to be disposed in generally axial alignment with the bores 92. The top plate 62 is provided with an elongate, generally rectangular groove 96 extending generally upwardly from the lower surface 98 thereof adapted to be positioned in overlying alignment with the bores 90 and apertures 94. A plurality of apertures 100 are provided extending from the upper surface 102 of the top plate 62 to the bottom 104 of the recess 96 and in generally central alignment with the apertures 94 and bores 90. The apertures 100 are configured to substantially coincide with the configuration of the packages to be sealed.

The guides 76 are of generally cylindrical configuration provided at the upper and lower end portions with counterbores 106 and 108, respectively, terminating within the interior of the guide 76 to define therebetween a web 110. The web 110 is provided with a generally axially extending threaded aperture 112, adapted to adjustably receive therein the adjustment screw 78. The adjustment screw 78 is provided, at the lower end portion thereof, with the other end portion of the spring 80 being positioned generally centrally of the bore 90, as by being disposed within a countrbore 116 extending generally downwardly of the bottom 118 of the bore 90. The upper end portion of the adjusting screw 78 is provided with drive means, such as a cross slot 120 to enable the adjusting screw 78 to be positioned relative to the guide 76 to vary the upward force applied thereto by the spring 80, or the loading force applied to the package during sealing thereof. The aperture 94 in the intermediate plate 64 is preferably of lesser diametrical extent than the bore 90 and the guide 76, enabling the intermediate plate 64 to retain the guide 76 within the bore 90, while enabling access to the adjusting screw 78 by removing the nest seat 74, as will become more apparent hereinafter.

If desired, the intermediate plate 64 may be movably mounted within the base block 60 so as to be movable to a lower position, as by means of air cylinders, belafram diaphragms, or the like, to push the guide member 76 downwardly enabling the nest member 72 and the associated package to move downwardly during evacuation and flushing of the working chamber to enable thorough flushing and evacuation or pressurization of the interior of the package prior to sealing. For example, the end portion of the intermediate plate 64 may be provided with bevelled portions 79 adapted to be engaged by and cammed downwardly by bevelled piston members 81 slidably disposed within bores 82 extending generally laterally outwardly therefrom upon pressurization of the bores 83 behind the piston member 81. In such an arrangement, the cap screws 70 would function as stop members to limit upward movement of the intermediate plate 64.

Similar means may also be provided to move the top plate 62 to provide clearance for leads extending outwardly of the lead frame or package 252, if desired. Likewise, a separate piston and cylinder arrangement or belafram diaphragm arrangement may be utilized for each of the guides 76 to withdraw the guides 76 downwardly to accomplish a similar function.

The nest seat 74 is of generally cylindrical configuration, provided with a recess 122 in the lower end portion thereof to provide clearance for the adjusting screw 78. The upper end portion of the nest seat 74 is provided with a generally spherical seating surface 124. The nest 72 is provided on its lower surface with a generally spherical seating surface 126 having the same curvature as the seating surface 124, enabling the nest 72 and the nest 74 to accurately seat, one on the other, to transmit the pressure developed by the spring 80 therethrough to the upper surface 128 of the nest 72, and effectively defines a ball type joint enabling automatic compensation for variations in flatness or parallelism of the package and/or lid.

In order to maintain proper positioning of the flat pack, the spherical surfaces 124 and 126 preferably define the spherical surfaces having their foci located centrally of the sealing plane, so that non-flatness or non-parallelism of the packages will only result in a rotation of the package and nest about the centroid of the seal plane without producing a translation or skewing thereof. Hence, the spring compression and loading will remain substantially constant and will not be affected by non-parallelism or non-flatness of the package. The apertures 100, obviously, must be of sufficient extent to enable such rocking or rotation of the nest and package. The nest, accordingly, may be described as comprising self-aligning pressure biasing package support means.

As an aid in providing both accurate temperature gradients and to protect the components within the packages from excessive heating, the base block 60 is further provided with coolant passage means comprising, for example, inlet and outlet passages 130 provided with threaded portions 131 adapted to receive therein fittings 132 for securing therewith flexible hoses, or the like 133, header passages 134 extending on opposite sides of the work stations and closed at the outboard ends thereof as by means of threaded plugs 135, cross passages 136 extending at least between the header passages 134 and on opposite sides of each of the work stations and closed at the outboard ends thereof, as by means of threaded plus 137. Accordingly, the coolant will substantially completely closely surround each of the work stations to cool at least the guides 76, nest seats 74 and nest 72 which are all preferably fabricated of a material having high thermal conductivity. The base block 60 is also provided with a generally peripherally extending groove or recess 138 in the upper surface 84 thereof. An O-ring type seal 139 is seated within the groove or recess 138 enabling tight hermetic sealing between the base block 60 and the mating portions of the upper assembly 24 when the lower assembly 26 is in the sealing position thereof.

Accordingly, it may be readily seen that various size nests and packages may be readily accommodated by the provision of a plurality of interchangeable top plates, nests, and nest seats, made up as sets, and being readily replaceable within the base block 60 by the removal and replacement of the screws 68. The appropriate seating pressure for differing size nests and/or packages may be readily adjusted by means of the adjusting screws 78.

The top plate 62, as readily apparent from the drawing, is essentially flat, unobstructed, and readily accessible. Furthermore, the top plate 62, and the space above it, is substantially uncluttered. Hence, loading of the packages onto the nests 72 is an especially simple and easy operation. Moreover, the space available over the nests 72 and top plate 62 enables the apparatus or machine 20 to be readily loaded either by hand, i.e., by individual positioning of a package or lead frame on each nest, or by batch techniques, i.e., by inserting a preloaded carrier into the machine to position a package or lead frame on all of the nests simultaneously. Furthermore, the uncluttered top or tooling plate 62 provides sufficient room for mounting auxiliary devices, for example package nesting structures such as scissor nest devices, or the like, if desired. Package lids or covers may similarly also be easily batch loaded because of the generally open construction of the apparatus or machine 20.

The base block 60, top plate 62 and intermediate plate 64 may, for example, be fabricated of aluminum. The nest seat 74, the guide 76, adjusting screw 78 and spring 80 may, for example, be fabricated of stainless steel. The nest 72 may, for example, be fabricated of brass.

The coolant flowing through the lower coolant passage means 130 may be of substantially any temperature cooler than the sealing temperature, and may even be refrigerated for maximum cooling. Preferably, however, the cooling fluid is temperature controlled, as by refrigeration, to enable repeatable and reproducible temperature conditions, or thermal gradients within the machine or apparatus 20 for maximum control of the sealing process.

As hereinbefore pointed out, the sealing process involves transient control of temperatures at the seal region throughout the sealing process. It is only by complete control of the surrounding temperatures and temperature gradients that the temperature conditions at the seal region can be accurately repeatably and reproducibly controlled. Hence, an important feature of the present invention is controlled heat sinking of the package, or a controlled heat drain from the package or lead frame opposite the lid or cover. If the temperature gradient through the package to the nest is too high, improper sealing and/or thermal stressing of the package may result. On the other hand, an insufficient temperature gradient through the package my result in excessive heating of the package contents, loss of control of the seal temperature during cool-off or anneal thereof and an inordinately long seal formation time.

Hence, control of the heat drain through the nest is of high importance to the present invention. The materials, arrangement, configuration, size, etc. of the nest assemblies and lower block, together with the temperature of the coolant are all factors affecting the heat drain and, accordingly, the temperature gradient in the package and may therefore be varied for different package configurations and materials to provide proper sealing thereof.

It may even be necessary, in some cases, to provide insulation or a heat input in the nest heat circuit to limit the temperature gradient to the proper value.

With particular reference now to FIGS. 5, 6 and 7, the upper assembly 24 comprises a generally rectangular base block 140 provided with a generally rectangular recess 142 extending generally upwardly therein from a lower surface 144 which is adapted to engage the upper surface 84 of the base block 60 of the lower assembly 26, the cylinder pressure being sufficient to compress the O-ring sufficiently to retain the internal gas pressure between the assemblies. Hence, the upper base block 140 effectively defines a bell jar structure capable of being hermetically sealed with the lower base block 60 when the lower assembly 26 is raised to the sealing position thereof. The upper base block 140 is provided with a plurality of generally laterally outwardly extending ribs or flanges 146 provided with apertures to retain the sleeve type bearings 39 enabling the tie rods 36 to movably extend therethrough. The lugs or flanges 146 are generally medially positioned relative to the vertical dimensional extent of the upper base block 140 to enable the lower base block 60 to be pulled upward into engagement therewith by means of the tie rods 36 by a direct, in line pull, precluding any tendency towards mis-alignment therebetween. A generally elongate terminal block 148, having, for example, a generally T-shaped cross sectional configuration is secured with the upper base block 140 within the chamber or recess 142 thereof, such as by being secured against the bottom surface 150 of the chamber or recess 142 by means, not shown. The terminal block 148 preferably is fabricated of an electrically insulating material, for example a ceramic such as Micalex 500, or the like, to which the various heaters, connectors, etc. are secured in a manner to be hereinafter described.

For example, a separate heater assembly 152 may be provided secured with the terminal block 148 for each of the work stations. The terminal block 148, at each of the work stations is provided with a right hand and a left hand feed assembly 154 and 156, respectively. The feed assemblies 154 and 156 each comprise a feed block 160 secured with the terminal block 148, as by means of screws 158 and wire leads 162 provided with insulating sleeves 164 fabricated of Teflon, or the like. The wire leads 162 are secured with the feed block 160, as by being welded, soldered, braised, or the like, within apertures 166 extending transversely through the feed blocks 160. The right hand and left hand feed assemblies 154 and 156, for example, may be secured on opposite sides of the T projection 166 of the terminal block 148. The terminal block 148 is further provided, at each of the work stations, with at least one pair of thermocouple connectors 168. As shown, there may be provided two pairs of thermocouple connectors 168 for each work station, enabling separate thermocouples to be used for providing a feedback signal for controlling the feedback temperature profiling equipment, to be described in more detail hereinafter and the other pair of thermocouple connectors be utilized, for example, to provide connection for a separate monitoring thermocouple, or, to enable direct measurement of temperatures existing within the sealed package, or the like. Each of the thermocouple connector sets preferably comprise two thermocouple connectors fabricated of differing materials corresponding to the materials of the thermocouple, such as, for example, one thermocouple connector of each set being fabricated of Alumel and the other thermocouple of each set being fabricated of Chromel.

More particularly, each of the thermocouple connectors may comprise a contact base 170 secured with the terminal strip 148 as by means of screws 172 and a female connector portion 174 of essentially tubular configuration secured with the respective contact base 170, as by means of a threaded connection and contact nut 176. Hence, with the heater assemblies 152 removed, the female thermocouple connector portions and the heater feed assemblies will remain secured with the terminal block 148, as shown in the central portion of FIG. 5. The T projection 167 is provided with transversely extending apertures 178 to enable the wire leads 162 of the left hand feed assemblies 156 to extend therethrough so that both sets of wire leads will be available at the back of the upper base block 140, as shown.

The heater assemblies 152 are, accordingly, readily removable and replaceable upon the terminal block 148, to enable ready and simple exchange thereof for flat packages of differing size, etc.

The heater assemblies 152 each comprise a heater insulator 180 fabricated, for example, of a ceramic such as Micalex 500, or the like, a nest seat 182 provided with a heating element 184, a plurality of heater blocks 186 adapted to electrically connect the heating element 184 with the feed assemblies 154 and 156, and at least one set of thermocouple connectors 188 adapted to provide electrical communication with the terminal block thermocouple connectors 168.

For example, the heater assembly thermocouple connectors 188 may each comprise a contact base 190 secured with the heater insulator 180, as by means of a plurality of screws 192 and a male connector member 194 secured with the contact base 190 as by a threaded connection and a plurality of contact nuts 196, further enabling the securement of the thermocouple wire thereto. Each of the sets of heater assembly thermocouple connectors 188 comprises one connector fabricated, for example, of Alumel and one connector fabricated, for example, of Chromel.

The heater blocks 186 comprise a generally rectangular head portion 198 and an elongate generally cylindrical stem portion 200, the head portion 198 being adapted to be disposed on the lower surface of the heater insulator 180 and secured therewith as by means of a plurality of screws 202 with the stem portion 200 extending upwardly through the heater insulator 180 and into electrical contact with the respective feed block 160. The feed blocks 160 are each provided with a threaded aperture 204 adapted to threadedly receive a contact shoulder screw 206 for providing both firm electrical contact between the stem portions 200 of the heater blocks 186 and the feed blocks 160 and to secure the heater assemblies 152 relative to the terminal block 148 and readily and easily removable therefrom. A heater clamp 208 is adapted to be disposed on the lower surface of the head portion 198 of the heater blocks 186 and retained thereon by means of a screw 210 extending through the head portion 198 and the heater insulator 180 and retained by a contact nut 212, enabling the end terminations of the heater element to be clamped between the heater clamp 208 and the head portion 198 of the heater blocks 186.

The nest seat 182 is preferably provided with a hard and relatively smooth seating surface 214 at the lower end thereof configured to the approximate dimensions of the lid of the flat pack to be sealed, and, may, for example, be fabricated of stainless steel or hard faced with stainless steel. The nest seat 182 is provided with, for example, annular grooves 216 enabling the heater element 184 to be disposed therein and with one or more thermocouple wells 218 adjacent the seating surface 214 thereof with the thermocouples 220 being disposed therein, preferably electrically insulated therefrom, and the leads thereof being secured with the heater assembly thermocouple connectors, as shown. The thermocouple wells may extend only partially through the nest seats 182 or may extend substantially entirely therethrough, or into a central bore passage 222 extending generally longitudinally therethrough.

The nest seats 182 are secured with the heater insulator 180, as by means of a shoulder screw 224 provided with a central aperture or passage 226 adapted to be disposed in line with the central passage 222 of the nest seat 182 and in line with an aperture 228 provided extending through the terminal block 148 and a passage 230 provided in the upper base block 140. O-ring type seals 232 may be provided adjacent the respective passages to provide hermetic sealing therearound. The apertures or passages 222, 226, 228 and 230 are utilized for providing a vacuum pickup to hold the package lids or frits in position prior to sealing thereof. Accordingly, the passage 230 is in selective fluid communication with a vacuum system, not shown.

Hence, it is readily seen that all that is required to replace an entire heater assembly 152 is to remove the two contact shoulder screws 206 associated with the heater assembly 152 whereupon the heater assembly 152 will be readily removable from engagement with the feed blocks 160 and the fixed thermocouple connectors 168, enabling a group of interchangeable heater assemblies to be readily interchanged to accommodate packages of differing configurations and heat requirements.

The lead wires 162 and surrounding insulating sleeves 164 extend rearwardly of the upper base block 140 through apertures provided therein which are appropriately sealed, as by O-rings, or the like, or by means of a lead seal plate 234 secured on the outer surface of the upper base block 140, as by means of screws 236.

The outer terminations of the lead wires 162 may, for example, be provided by means of disconnect terminals 238, fabricated of brass, or the like, mounted upon an insulated disconnect block 240, fabricated of an insulating material, such as plastic, or the like, by means such as screws 242 and nuts 244 which additionally serve to clamp the end portions of the lead wires 162 with the disconnect terminals 238. The disconnect block 240 may be structurally associated with the upper base block 140, as by means of a generally angular block support 246 and a plurality of screws 248 securing the disconnect blocks 240 with the block support 246 and the block support 246 with the upper base block 140.

The upper base block 140 may be further provided with passages, not shown, for enabling the flow of a coolant therethrough, and with passages for enabling atmospheric control, that is, for evacuation, back-filling, flushing, and/ or pressurization of the chamber or recess 142.

Accordingly, and with reference now more particularly to FIG. 8, the lids or frits 250 of the packages may be disposed or positioned on the seating surfaces 214 of the upper nest seats 182 and retained thereon by means of a vacuum drawn through the passages 222. The remainder of the package 252 may then be positioned on the lower nest seat 72 and the lower assembly 26 raised to the sealing position thereof whereat the springs 86 will provide a predetermined and appropriate loading between the lid or frit 250 and the package 252 during sealing. As heretofore pointed out, means may be provided to retain the lid or frit 250 and the package 252 in slightly spaced apart relationship during initial evacuation, flushing, back filling and/or pressurization, if desired. The heater element 184 is basically of wire form, comprising, for example, one or more coils of wire or one or more coils of coiled wire, depending upon the amount of heat energy required to be produced thereby.

It is also, however, within the ambit of the present invention to utilize heater elements having other than wire coil configuration. Accordingly, and with reference now to FIGS. 9 and 10, wherein like reference characters are used, the reference characters being primed, there is shown and illustrated another heater assembly 152' which may be directly substituted for the heater assembly 152 previously described and disclosed.

The heater assembly 152' comprises a heater insulator 180' fabricated, for example, of a ceramic material such as Micalex 500, or the like, to which there is secured the thermocouple connectors 188 as described in connection with the heater assembly 152, and which is adapted to be secured with the terminal block 148 in a similar manner to the manner of securement of the heater assembly 152, as by means of the screws 206 extending through the heater block 186' of somewhat greater dimensional extent than the heater blocks 186. The heater blocks 186' are secured with the heater insulator 180' as by means of a plurality of screws 202'. The nest seat 182' is of substantially lower mass than the nest seat 182 and comprises a heater cap 254 fabricated or provided with a lower surface of a high thermal conductivity to produce a uniform temperature across the heater, mounted upon the end of a heater cap stud 256 which is in turn secured with a heater cap lug 258, as by means of a set screw 260, enabling the heater cap and heater cap stud to be readily removed. The heater cap lug 258 is disposed within a transversely extending groove 262 provided in the heater insulator 180' and is secured therein by means of screws 264. The heater element 184' may comprise a coil of heater wire disposed within a generally annular groove provided in the heater cap 254, or, may comprise a flat or ribbon type heater element extending across the heater cap 254. The terminations of the heater element 184' are electrically connected with the heater blocks 186' by means of heater clamps 208' associated with the heater blocks 186', as by screws 210', similarly to the heater clamps 208. The heater assembly 152' provides a heater having lower mass than the heater of the heater assembly 152 and is efficiently cooled through the heat sinking post or stud 256. Hence, it is capable of accurate and rapid temperature profiling.

As hereinbefore pointed out, only one pair of thermocouple connectors is required for each heater assembly, the second set of thermocouple connectors above disclosed being usable to provide a separate monitoring function. Accordingly, and with reference now to FIG. 11, there is shown and illustrated a modified upper block assembly 24' utilizing only a single pair of thermocouple connectors for each work station and a simplified construction utilizing another embodiment or modification of nest seat 182" and eliminating the terminal block 148.

The base block 140' is provided with a post or extension 270 for each of the work stations extending downwardly into the chamber or recess 142'. The post or extension 270 may be integrally formed with the base block 140' or may be separately fabricated and secured therewith as by being press fit into apertures provided therein or threadedly engaged with such apertures. For simplicity, however, the post or extension 270 is shown and illustrated as being fabricated integrally with the base block 140'.

A single terminal contact base 170', fabricated, for example, of an electrically insulating and heat resistant material extends substantially entirely longitudinally of the chamber or recess 142' adjacent one side thereof and a plurality of female thermocouple connector portions 174' are secured therewith, as by means of nuts 176'. The feed blocks 160' are secured substantially directly with the upper base block 140', as by means of insulated screws 158' and the feed blocks 160' are electrically insulated from the base block 140', as by means of mica insulators 272. The heater insulator 180' then rests directly on the lower end surfaces of the post or extension 270 and the feed blocks 160' and is retained in position by means of screws 206' extending through the heater blocks 186' and heater insulator 180'.

The nest seat 182" comprises a generally cylindrical member 274 provided with a generally radially outwardly extending flange portion 276 and a threaded end portion 278. The cylindrical portion 274 which is provided with an aperture or passage 222' for vacuum pickup slides directly into an enlarged portion 280 of the bore or passage 230' provided in the base block 140'. These is also provided annular insulating means 282, such as a mica disk which may be supplemented by an oxide coating juxtaposed with the flange portion 276 and in surrounding relationship to the threaded portion 278. A ribbon type heater element 284 is then positioned downwardly of the mica disk 282, the end portions thereof being structurally and electrically associated with the heater blocks 186' as by the screws 206'. The heater cap 286, which is preferably configured to the configuration of the lid or frit is preferably coated with a material which will not adhere to the hot package, such as stainless steel 288 and may, for example, be threadedly engaged on the threaded portion 278 of the member 274. The heater cap 286 is provided with at least one thermocouple well 218' for a thermocouple 220' to enable monitoring and control of the temperature of the heater cap 286.

Preferably, the generally cylindrical member 274 is fabricated of stainless steel, or the like, and the heater cap 286 is fabricated of a material having high thermal conductivity and thermal diffusivity, such as, for example, silver or copper.

Accordingly, the base block 140', which as heretofore pointed out, preferably is water cooled and which, along with the lower base block 60, is preferably fabricated of a material having high thermoconductivity, such as aluminum which acts as a very efficient heat sink to enable rapid and finely controlled heat profiling of the heater cap and associated package lid or frit. As is readily apparent, the heater assembly shown in FIG. 11 and above described may be readily removed, substituted, or replaced by merely removing the screws 206' and sliding the heating insulator 180', cylindrical member 274 and male thermocouple connector portions 194 out of engagement with the remaining portions of the upper assembly 24'.

While the heater strip 284 may be secured by means of the screws 206', as above described, preferably the heater strips 284 are separately secured with the heater blocks 186' so as to be removable therewith as a unit without damage.

Accordingly, and with reference now to FIGS. 12 and 13 wherein like reference characters are utilized for like parts, the reference characters being primed, the heater strip 284' may be secured with the heater blocks 186' by a plurality of screws 290 and the heater strip 284' being provided with a recess 292 to provide clearance for the attachment screw 206'. The heater strip 284' may further be provided with opposed notches 294 and configured with a central aperture 296 to further aid in providing a uniform temperature profile across the heater.

The heater structure of FIGS. 12 and 13 is particularly suitable for use with relatively large packages, wherein a close coupling is required, the heater blocks being closely adjacent the lid or package. However, for smaller packages, wherein space is not so limited, a clamp type arrangement may be utilized for the heater strip. Accordingly, and with reference now to FIGS. 14 and 15, wherein like reference characters are utilized with the reference characters being double primed, there is shown and illustrated another embodiment or modification of heater to heater block arrangement. In the arrangement or modification of FIGS. 14 and 15, the heater blocks 186" are somewhat wider than the heater blocks 186' and the heater strip 284" is secured therewith by means of a clamp 298 secured with the heater blocks 186" by means of screws 290'. In all other respects, however, the arrangement, embodiment or modification of FIGS. 14 and 15 is similar to that shown and illustrated in FIGS. 12 and 13 and hereinabove described.

As hereinabove pointed out, the apparatus or equipment is particularly adapted for use with a feed back or closed loop heat control system to enable accurate profiling of the temperature conditions existing during the sealing operation, although it is to be noted that the equipment or apparatus 20 is also suitable for use with open ended heat control systems, either of a programmed or profiling nature or a simple on-off timed heat cycle.

In order to enable the heater nests or caps to accurately follow or track the signals of the temperature controller and to enable the seal region of the package to likewise properly follow the programmed temperature profile, the heater nests or caps must fulfill several important thermal criteria. Firstly, they must be capable of rapid thermal response to variations in energy input to enable the nest or cap to accurately track the controller. Secondly, the nest or cap must have a natural heat loss rate greater than the most rapid cool off called for by the program to enable to controller to completely govern the cool off rate. Thirdly, the nest or cap must be capable of rapid and even heat transfer with the package lid or cover so that the seal region temperature will accurately track the programmed temperature profile.

These thermal characteristics of the heater assemblies are inter-related and dependent upon physical configuration, orientation or association with adjacent parts, and material, specifically the diffusivity thereof.

Diffusivity is defined as the quantity of heat passing normally through a unit area per unit time divided by the product of specific heat, density, and temperature gradient.

Hence, diffusivity is a measure relating all of the thermal characteristics on a transient base, that is, including a time factor.

By providing the heater nest seats or caps to have a high diffusivity, or with a high diffusivity layer adjacent the cover or lid of the package, the seats or caps will respond rapidly to energy input or drain, will have only small internal temperature gradients, that is, will be at a substantially uniform temperature throughout and especially across the lid or cover, and will rapidly and efficiently conduct heat energy to and from the lids or covers.

In other words, fabricating the heater nest seats or caps from high diffusivity materials enables the heater nest seats or caps to function as an almost instantaneous, or in any case, rapidly responsive heat transfer media for efficiently transferring heat to and/or from the package lid or cover. Furthermore, such construction enables the nest seat or cap to provide a uniform temperature face or surface substantially entirely across the lids or covers.

The heater nest seats or caps are thermally connected with the upper block by means of the cap screws or posts, respectively, securing them therewith. The cap screws or posts function as heat sinks or heat drains from the nest seats or caps to maintain their cooling rates higher than the maximum cooling rate of the programmed temperature profile so that energy input to the heaters will control the cooling rate. If, however, excessive heat is lost or removed from the nest seats or caps into the heat sink or drain, then an excessive amount of energy input thereto will be required, resulting in uneconomical operation. The rate of heat loss or drain into the upper block is easily controlled by proper selection of the post or cap screw material and size, coolant temperature, and heater insulator. Under some circumstances, it may be desirable to utilize high or low conductivity screws or posts, or even thermally insulated screws or posts. Also, the coolant may be refrigerated. The heater face may also, if desired, be selected to provide a desired temperature gradient through the package, and the height of the heater may be varied to compensate for differing thickness packages.

Accordingly, the present invention effectuates sealing of a flat package by providing a programmable, reproducible and repeatable temperature gradient through the package, the gradient being uniform in the lateral direction. By providing such a temperature gradient, that is, one specified and programmable temperature on the lid or cover side of the package and a second specified temperature or heat sink condition on the other or circuit side thereof, the physical nature alone of the flat pack will determine how heat flows into it, resulting in a constant physical situation which is sufficiently physically correct as to enable planning of a temperature program by simple computer integration of a model based only on the physical nature of the materials.

This two temperature condition, i.e., repeatable and reproducible temperature on both sides of the package is achieved by the high diffusivity heater structure, proper heat sinking of the heater and the self-aligning, spring loaded, heat sink nests. The orientation of the package, i.e., right side up, as illustrated, or upside down, is of secondary importance, but, as heretofore pointed out, it is preferable to seal in the right side up orientation to protect the components being packaged from excessive heating.

In other words, the heater assemblies present a constant heat transfer surface to one side of the flat pack, and the nests present a heat sink or constant heat transfer surface to a second side thereof.

Moreover, it is not necessary to provide separate heater assemblies for each station, although such structure enables "plug in" independent interchangeability for each station. Nor is it necessary to fabricate the heater assemblies from metal or to structurally associate the heater assemblies with the upper assembly. A single heater assembly having continuous heater means or separate heater means for separate portions thereof, associated with or disassociated from the upper assembly, fabricated of many diverse materials may, for example, be utilized without departing from the present invention. It is also within the ambit of the present invention to utilize a single heater element or a plurality of heater elements under control of a single feedback controller or a plurality of feedback controls together with a single heat transfer surface extending over a plurality of work stations.

By way of example, a single heat transfer surface comprising a high diffusivity material, such as copper, silver, carbon, graphite, or the like, may be provided extending over a plurality of work stations. The heat transfer surface may be provided with a plurality of heater elements, one for each station or group of stations, be provided with a single heater element for heating the entire surface, or even be directly or indirectly heated, as by direct resistance heating or by RF or induction heating. The surface may, furthermore, be fabricated entirely of high diffusivity material or be provided with a layer of high diffusivity material adjacent the sealing surface, all without departing from the present invention.

Figure 16:
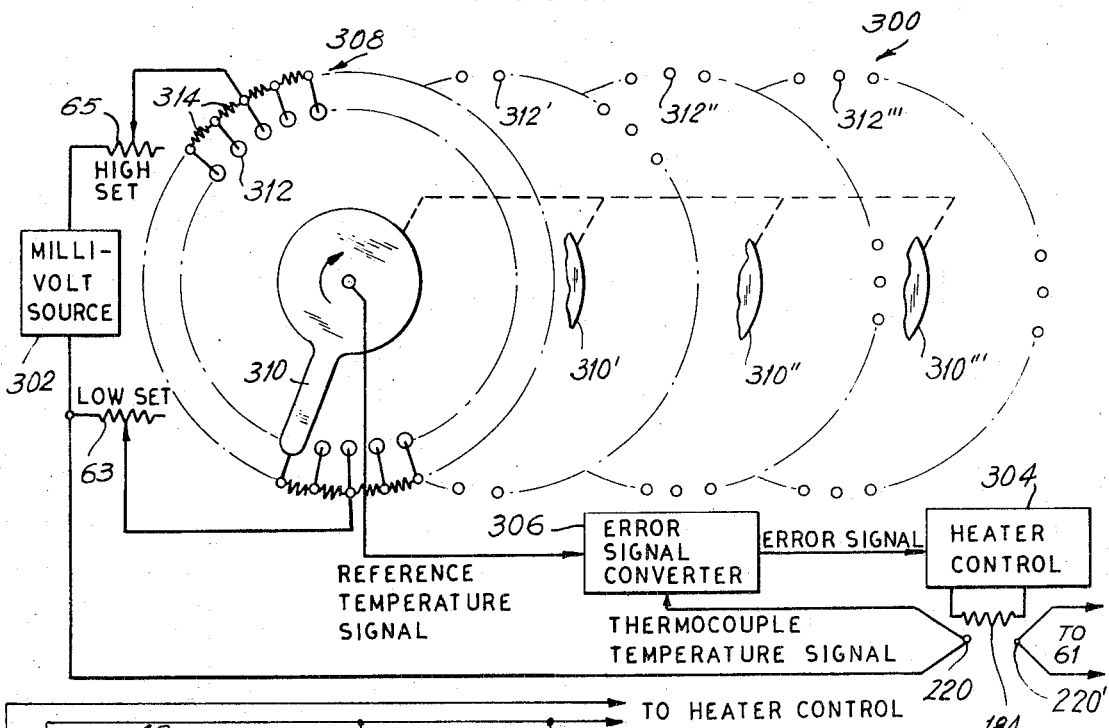
FIG. 16 is a schematic wiring diagram of a temperature profiling system suitable for use in the present invention.

With reference now to FIG. 16 there is schematically shown and illustrated one example or embodiment of a programmed, feed back or closed loop heat control system suitable for use with the present invention and generally designated by the reference character 300.

The control system 300 utilizes the millivolt difference between the volted generated or developed by the temperature sensors, such thermo-resistors or the thermocouples 200 positioned adjacent the heater means, such as the heating element 184 and a programmed temperature demand signal derived from a stable, regulated millivolt power supply 302, the millivolt difference or error signal being utilized to provide control, through a heater control 304, of the power supplied to the heating element 184, the error signal being derived, for example, by an error signal converter 306. While only a single error signal converter 306, heater control 304, heater 184 and thermocouple 220 is shown in FIG. 16, it is to be understood that these components are duplicated for each of the work stations so that, in the machine or apparatus 20 there would be provided seven error signal converters 306, heater controls 304, heater elements 184 and control thermocouples 220. There is also shown in FIG. 16 a second thermocouple 220' for enabling monitoring of the actual temperature of the heater temperature, although the thermocouple 200 may be utilized for both feedback and monitor purposes.

The millivolt source 302 may be of substantially any design and construction, and preferably is so constructed and arranged as to provide an adjustable output, as by comprising a settable tapped resistor or potentiometer connected across the output thereof. Programming or profiling of the reference or programmed temperature signal applied to the error signal converter 306 may, for example, be provided by means of a driven potentiometer resistance 308 connected across the output of the source 302. The driven potentiometer resistance 308 is so constructed and arranged that the resistance thereof, and hence the output voltage thereof varies in accordance with the desired temperature profile.

By way of example, the driven potentiometer resistance 308 may be constructed utilizing a stepper switch or relay having a wiper contact 310 and a plurality of fixed contacts 312 sequentially connectable with the wiper contact 310. Fixed resistors 314 are connected between the adjacent fixed contacts 312, the resistance values of the fixed resistors 314 being chosen to define the desired voltage change between adjacent positions of the wiper contact 310, the millivolt source 302 being connected with a selected two of the fixed contacts 312, as shown. Preferably, there is also provided a variable low temperature set control or variable resistor 63 and a high set variable resistor or range control 65 connected in series on opposite sides of the source 302. The wiper contact 310 may be driven in response to a pulse timer so as to sequentially step relative to the fixed contacts 312.

Accordingly, as the wiper contact 310 steps about the fixed contacts 312, the reference or programmed temperature signal will vary in direct ratio to the values of the fixed resistors 314. Moreover, the reference temperature signal may be programmed to follow substantially any profile by proper selection of the fixed resistors 314.

For example, if adjacent ones of the resistors 314 are of equal resistance, then the reference signal will be of essentially constant slope, though incremental in nature. If adjacent ones of the resistors 314 are of non-equal resistance, then the slope of the reference signal will vary. If one or more of the resistors 314 should be shorted or replaced by a non-resistive conductor, then the reference signal produced during this cycle portion would be constant, providing a dwell period.

Moreover, it should be noted that variations in the drive speed of the potentiometer resistor would similarly affect the profile of the reference signal, as would the substitution of time-sensitive or otherwise active components for one or more of the resistors. Additionally, it is to be noted that the use of inductions, transformers, autotransformers, or the like, for providing all or part of the reference signal would also be within the scope of this invention.

Additionally, by the provision of additional contact levels, such as contact levels 312, 312" and 312''', together with associated wiper contacts 310', 310" and 310''' driven in synchronism with the wiper contact 310, various supplementary functions may be synchronized with the changes in the reference temperature signal. For example, one of the contacts 312' may be connected with a dwell timer to halt, for a specified period of time, the movement of the wiper contacts. Hence, the reference temperature signal and, accordingly, the heater temperature, may be programmed to provide a programmed temperature rise, a dwell at a specified temperature and a programmed temperature decrease or anneal of the package seal. As a further example, one of the contacts 312" may be utilized to initiate a post-pressurization of the chamber atmosphere during the seal formation, as more fully described and disclosed in applicant's co-pending application Ser. No. 558,142 filed June 16, 1966. Other levels, such as the contacts 312''' may be similarly utilized, and, may even be utilized to provide cycle control prior to, during and subsequent to the heat cycle.

A similar closed loop or feed back control system, which is also suitable for use in the present invention is more fully described, disclosed, illustrated and shown in applicant's co-pending application Ser. No. 642,627 filed on or about May 4, 1967, and entitled Temperature Controller Employing Closed Loop Feedback and Incremental Programming.

Figure 17:
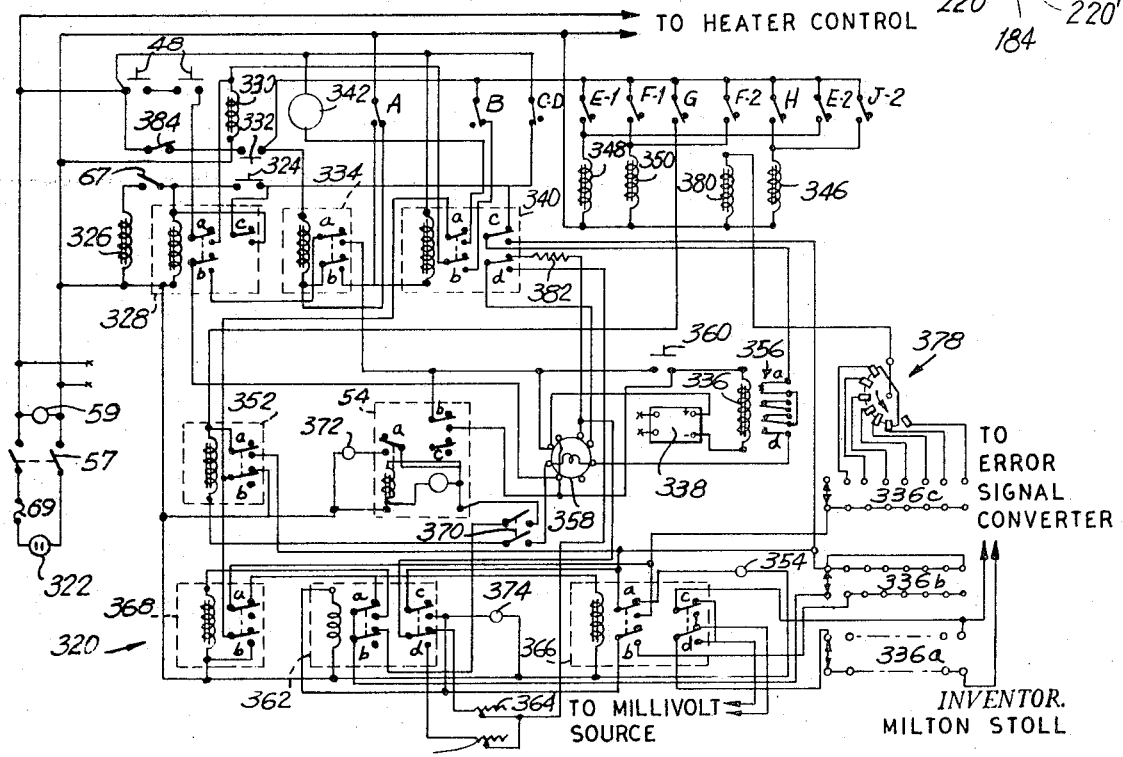
FIG. 17 is a schematic wiring diagram of a control system suitable for use with the present invention.

With reference now to FIG. 17, there is shown and illustrated a schematic wiring diagram of the overall electrical control system, designated generally by the reference character 320 for cyclically operating the machine or apparatus 20. The system 320 is substantially similar to the control system described, disclosed, illustrated and shown in applicant's co-pending application Ser. No. 558,142 filed June 16, 1966 and the hydraulic and pneumatic systems therefor are also shown in applicant's co-pending application Ser. No. 558,142 filed June 16, 1966. Accordingly, the system 320 will be only briefly described herein, reference being specifically made to applicant's co-pending application Ser. No. 558,142 for a more detailed disclosure thereof.

The power is supplied to the system 320 as by means of a plug 322 connected with the main power switch 57 through the fuse 69, with the pilot lamp 59 being connected to indicate when the power is on. With the cover vacuum control switch 67 closed, a vacuum may be drawn through the passages 222 in the upper assembly 24 to hold the covers or lids 250 in position on the heaters by closing a switch, such as a foot switch 324 to actuate a vacuum solenoid control valve 326. Simultaneously with the actuation of the solenoid valve 326, a relay coil 328 will also be actuated closing holding contacts 328c thereof to lock in the relay 328 and the cover vacuum solenoid 326. Relay contacts 328a will then be closed enabling actuation of both start buttons 48 to power an air valve solenoid 330 admitting high pressure air to the cylinder 30 to raise the lower assembly 26. When the lower assembly 26 is fully raised to the sealing position thereof, the build-up of high pressure air in the cylinder 30 actuates a pressure switch 332 actuating a relay coil 334.

The closing of relay contacts 324a causes the actuation of the stepper coil 336 through the relay contacts 328b and a low voltage supply 338 to advance the wiper contacts 310 one step. Simultaneously, the closing of relay contacts 324b actuates a relay coil 340.

The closing of relay contacts 30a starts a cam timer motor 342 and the closing of contacts 340b locks in the cylinder air valves solenoid 330. Cam contact 342a then interlocks relay 340 to the end of the cam timer cycle. Cam contacts 342c–d then open to shut off the cover vacuum since the head is now closed and the vacuum is no longer required. Relay coil 328 is also released to insure termination of the initial current to the stepper coil 336 even if the relay coil 334 does not open before relay coil 340 closes, since relay coil 334 could be kept actuated through its b contacts.

Cam contacts 342j–l then closes actuating a vacuum solenoid valve 346 to evacuate the chamber. The exhaust solenoid valve 348 may simultaneously be kept open as a mechanical check valve prevents outside air back through the exhaust valve, as disclosed in application Ser. No. 558,142, if desired. After the evacuation of the chamber is complete, low pressure nitrogen may be admitted to the chamber by means of a nitrogen solenoid valve 350 to back-fill and flush through the open exhaust valve 348. When the cam contacts 342e close, closing the exhaust valve 348, chamber pressure builds up to the line pressure of the low pressure nitrogen or other inert gas, which may be controlled by means of a low pressure reduction valve off of the high pressure inert gas supply. Evacuation and back-fill or flush and back-fill can be repeated, if desired.

The packages are now ready for sealing and cam contact 342g now actuates a relay coil 352, opening relay contacts 342d to stop the cam timer motor 342. The relay contact 352a simultaneously close actuating a "pulse-up" indicating pilot light 354 and feeds power to the level to wiper contact 310' and to contacts 340c to a normally closed contact path 356a of a stepper mechanical actuator 356. The contacts 356a are normally closed, but open during actuation of the stepper coil 336. The contacts 356a feed power to contacts 356d which are normally open when the stepper is in a zero position but remains closed on all other positions. Power then is delivered through contacts 356d to a pulse relay 358, which provides timed pulses to control the movement of the stepper.

The pulse timer 358, in conjunction with coil 336 continues to give alternate pulses by bypassing a manual pulse switch 360. The pulse timer 358 is also connected through 340d and contacts 362d of a relay 362 with a pulseup time rheostat 364 to control the pulse rate during the "pulseup" portion of the heat cycle.

Relay contacts 336a are wired for the pulseup condition through contacts 366c and d of a relay 366. The stepper switch 336 continues to zero at which point the mechanical interrupter contacts 356d open and the contacts 336b feeds 362a and b. Power through relay contacts 362a in series with contacts 368a of a relay 368 feeds power to the pulse relay 358 and to the contacts 336c. Contacts 362a also reverse the polarity to the contacts 336a, but could also be utilized to feed power to an alternate level of the stepper switch permitting a different slope, through contacts 366c and d. When relay 366 is actuated contact 366b close interlocking the coil 366 through relay contacts 368a until relay 368 opens.

Relay contacts 362b now feed power through the pulse on-off switch 370 to the dwell timer 54, the clutch of the dwell timer 54 actuates, contacts 54a close lighting a dwell indicator pilot light 372. At the end of the dwell period, contacts 54b are closed feeding power to the pulse timer 358 causing the stepper to move to position 1. The contacts 336b as position 4 feeds power through contacts 366b which was previously closed actuating the coil 362.

Actuation of relay 362 powers a "pulsedown" indicating pilot lamp 374 through contacts 362c and interlocks the relay coil 362 until relay 352 opens through contacts 352a and through contacts 362d actuates a pulsedown rheostat 376. Contacts 362b open cutitng off the timer 54.

Contacts 366c now function to interlock the coil 366 and to supply power to the stepper contacts 336c. Relay 362 is interlocked through the closed contacts 362c. A selector switch 378 may be provided to enable the selection of a particular temperature or time after dwell at which the high pressure nitrogen solenoid valve 380 is opened to provide post pressurization.

The circuit now pulses down to zero. At the zero level of contacts 336b, the relay coil 368 is actuated through the contacts 362a causing the opening of contacts 368a which had been receiving power from the contacts 336b. Actuation of relay 368 also causes the closing of contacts 368b which starts the cam motor 342 again. Opening of the contacts 368a de-energizes the relay coil 366 while the relay 362 remains actuated, being interlocked through the contacts 362c.

Since the cam motor 342 is again actuated, when cam contacts 342g open, relay 352 is de-energized, de-energizing relays 368 and 362 and the stepper 366 is now ready for the next cycle, the cam timer program continuing until the initial position is reached since the contacts 352b are closed. Cam contacts 342e open and the exhaust valve solenoid 348 is de-energized, opening the exhaust valve to exhaust the chamber. Cam contacts 342b then open, de-energizing the cylinder air valve solenoid 330 causing the air cylinder 30 to return the lower assembly 26 to the lower or loading position thereof. As the pressure responsive switch 324 is opened by the release of pressure beneath the piston in the cylinder 30, only cam contact 342a will remain energized to cause the cam motor 342 to complete the cycle. At the end of the cycle cam contacts 342a causes de-actuation of the relay coil 340 opening the relay and stopping the cam motor 342.

If there is an interruption of the power in the middle of a cycle and the stepper switch 336 is in an intermediate position, operation of the pulse on-off switch 370 permits power through cam contacts 342c–d to feed through relay contacts 340c to contacts 356a and 356d to pulse timer 358 and through the pulse on-off switch 370 to cam contact 342b. The pulse rate is controlled by contacts 340d and a resistor 382 across the pulse timer 358.

The contacts 336a are connected with a millivolt power supply, error signal converter, heater control, thermocouples, etc. as previously described. There may also be provided a normally closed emergency stop switch 384.

While the invention has been described, disclosed, illustrated and shown in terms of certain preferred embodiments or modifications which it has assumed in practice, the scope of the invention should not be deemed to be limited by the precise embodiments or modifications herein described, disclosed, illustrated and shown, such other embodiments or modifications as may be suggested to those having the benefit of the teaching herein being intended to be reserved especially as they fall within the scope and spirit of the claims here appended.

What is claimed is:

1. Apparatus for sealing lids or covers on flat packages such as packages utilized to enclose electronic components, the apparatus comprising, in combination, an upper assembly, a lower assembly, means for providing relative movement of at least one of said upper and lower assemblies between a loading position whereat said lower assembly is spaced apart from said upper assembly and a sealing position whereat said lower assembly is subjacent said upper assembly and defining therebetween a hermetically sealable chamber, means mounted for movement with said lower assembly for supporting said packages in a generally upright position, means mounted for movement with said upper assembly for holding such lids in alignment with such packages to assemble the lids to the packages during the relative movement to the sealing position, means for controlling the atmosphere within said chamber, heater means mounted with said lid holding means for conductive heat transfer association with at least the sealing region of said lids and constructed and arranged for rapid temperature changes along a predetermined temperature profile, means in heat conductive association with the package holding means and a thermally controlled heat sink for controlling heat flow through the packages, feedback control means for programming the energization of said heater means, and cyclic control means for automatically cycling said apparatus to assemble and seal the packages in a controlled atmosphere.

2. Apparatus defined in claim 1 wherein said heating means comprises an electrical resistance heater having a high thermal diffusivity and a low mass and specific heat so that it is capable of being heated at a rate faster than the desired temperature profile thermally coupled to a cooled heat sink so that in the absence of the application of electrical power thereto the heater will cool at a rate faster than the desired temperature profile enabling the instantaneous temperature of the heater to be controlled along the desired sealing temperature profile by the application of electrical energy thereto, said programming control means comprises programmed reference signal generator means, temperature sensing means thermally coupled with said heater means, error signal converter means for comparing the output of said reference signal generator means and the output of said temperature sensing means and heater power control means responsive to the output of said error signal converter means for varying the heater power in response thereto to program the heater temperature along the desired temperature profile.

3. Apparatus for sealing lids or covers on flat packages such as packages utilized to enclose electronic components, the apparatus comprising, in combination, an upper assembly, a lower assembly disposed generally beneath said upper assembly, an expansible chamber motor mounted with and extending generally upwardly from the center of said upper assembly for providing relative movement of at least one of said upper and lower assemblies between a loading position whereat said lower assembly is spaced beneath said upper assembly and a sealing position whereat said lower assembly is subjacent said upper assembly to define an hermetically sealable chamber therebetween, means for supporting the packages to be sealed within said chamber, heater means for supplying heat to effectuate sealing of the packages, a lifting frame extending generally horizontally outwardly of said motor means on either side thereof for movement thereby across and away from said upper assembly and a pair of tie rods mounted symmetrically on opposite sides of said lifting frame and extending downwardly to said lower assembly so that the lifting moment will be applied generally linearly and laterally equally thereto.

4. Apparatus for sealing lids or covers on flat packages such as packages utilized to enclose electronic components, the apparatus comprising, in combination, an upper assembly, means for providing relative movement of at least one of said upper and lower assemblies between a loading position whereat said lower assembly is spaced apart from said upper assembly and a sealing position whereat said lower assembly is subjacent said upper assembly to define an hermetically sealable chamber therebetween, said upper assembly comprising, in turn, base block means provided with a recess extending generally upwardly and inwardly of the lower surface thereof, an electrically and thermally non-conductive refractory heater insulator, heater means fixedly mounted with said heater insulator for supplying heat to effectuate sealing of the packages, transducer means mounted with said heater means for providing electrical signals proportional to the temperature thereof, means for removably positioning and supporting said heater insulator generally within said recess and for providing electrical interconnections to said heater and transducer means and comprising, in turn, a plurality of electrically conductive feed blocks electrically connected with a source of power and fixedly non-conductively mounted with said base block, a plurality of electrically conductive heater blocks electrically connected with said heater means and fixedly mounted with said heater insulator, each of said heater and feed blocks being provided with apertures positioned to be disposed in axial alignment with one another upon assembly of said insulator with said base block, electrically conductive threaded fastener means extending therethrough, a plurality of transducer electrical connector portions mounted with and extending generally upwardly of said heater insulator and electrically connected with said transducer, a plurality of mating transducer connector portions mounted electrically nonconductively with and extending generally downwardly from said base block for slidably electrically conductive connection with said heater insulator transducer connector portions upon assembly and securement of said heater insulator with said base block to enable simply and easy removal, replacement and exchange thereof for repair, adjustment and substitution to accommodate packages of diverse configuration.

5. Apparatus defined in claim 4 further comprising thermally conductive elongated post means extending generally downwardly into said recess generally centrally thereof, said heater means being disposed in general alignment therewith and said feed block and transducer connector portion being disposed generally symmetrically on opposite sides thereof, coolant passage means extending through said base block generally adjacent said post means, feedback power control means connected with said transducer and said heater means for profiling the temperature thereof, and thermally conductive heat sink means thermally conductively connected with said post means and said heater means for cooling said heater means to enable complete electrical control of the temperature thereof, said heater means comprising a low mass and specific heat.

6. Apparatus for sealing lids or covers on flat packages such as packages utilized to enclose electronic components, the apparatus comprising, in combination, an upper assembly, a lower assembly, means for providing relative movement of at least one of said upper and lower assemblies between a loading position whereat said lower assembly is spaced apart from said upper assembly and a sealing position whereat said lower assembly is subjacent said upper assembly to define an hermetically sealable chamber therebetween and means for supporting packages to be sealed within said chamber, said upper assembly comprising, in turn, base block means provided with a recess extending generally upwardly and inwardly of the lower surface thereof, an electrically and thermally nonconductive refractory heater insulator, heater means fixedly mounted with said heater element to effectuate sealing of the packages, a plurality of electrically conductive feed blocks electrically connected with a source of power and fixedly non-conductively mounted with said base block, a plurality of electrically conductive heater blocks electrically connected with said heater means and fixedly mounted with said heater insulator, each of said heater and feed blocks being provided with apertures positioned to be disposed in axial alignment with one another upon assembly of said insulator with said base block and electrically conductive threaded fastener means extending therethrough, said heater means comprising at least one heater member comprising, in turn, a generally elongated highly thermally conductive member extending generally vertically through said heater insulator into thermal communication with said base block and having a flange portion extending generally laterally outwardly thereof beneath said heater insulator and adjacent the lower end portion thereof, a strip-type electrical resistance heater element having a generally central aperture disposed subjacent said flange portion and in surrounding relationship to the lower end portion of said elongated member and electrically insulated therefrom, means for cooling said base block to withdraw heat from said elongated member, and a heater cap having a generally central bore tightly secured with the lower end portion of said elongated member subjacent said heater and electrically insulated therefrom, said heater cap being configured on at least as low a surface to substantially the contour of the cover or lid to be sealed and comprising a high diffusivity lower layer to provide a substantially uniform temperature which may be rapidly and accurately profiled.

7. Apparatus defined in claim 1 wherein said package support means comprises nest means configured on its upper surface to substantially the contour of such packages and configured on its lower surface to a substantially downwardly convex spherical configuration and supported by a nest seat having a generally downwardly concave spherical configuration and means for biasing said socket generally upwardly to enable close contact between said nest means and the packages and automatic compensation for inaccuracies and deviations between packages to be sealed.

8. Apparatus defined in claim 7 further comprising means for varying the tension of said biasing means so that the pressure applied between the package and lid may be regulated and controlled.

9. Apparatus defined in claim 7 further comprising a plate having an opening configured substantially to the periphery of the packages to which said nest means extends and means for selectively rendering said biasing means inoperative so that the upper surface of said nest means is lowered beneath the surface of said plate to provide a recess for positioning and loading of the packages.

10. Apparatus defined in claim 7 wherein said lower assembly comprises a base block provided with a recess extending generally downwardly inwardly of the upper surface, a guide slidably positioned for generally vertical movement within said recess and provided with a cavity extending generally downwardly inwardly of the upper surface thereof, an intermediate plate extending generally laterally across said recess beneath the upper surface of said base block for retaining said guide within said recess and provided with an aperture in general vertical alignment with said cavity, said biasing means being disposed beneath said guide for urging said guide upwardly and said nest seat being disposed with the lower end portion thereof within said cavity and extending upwardly thereof through said aperture, and a top plate removably secured extending generally laterally across the top of said recess to retain said nest seat within said recess having an opening extending generally vertically therethrough in general alignment with said downwardly spherical concavity, and wherein said nest means is disposed within said opening to enable simple and easy removal, replacement and exchange of said nest means for repair, adjustment and substitution to accommodate packages of diverse configuration, by removal of the top plate, nest means and nest seat, without requiring removal of said guide and biasing means.

11. Apparatus defined in claim 10 wherein said biasing means comprises a compression spring disposed between said guide and the bottom of said recess and a threaded member engaged with said guide and extending downwardly therethrough, the lower end portion of said threaded member engaging the upper end portion of said compression spring, and the upper end portion of said threaded member being accessible through said cavity to enable adjustment thereof without removing said guide.

12. Apparatus defined in claim 10 further comprising means to enable selective lowering and retraction of said guide and nest assemblies downwardly so that the lids and packages may be maintained in spaced apart relationship during purging of said chamber and assembled by raising of said guide and nest assemblies after such purging.

13. Heater means for sealing packages, such as small flat packages utilized for enclosing electrical devices by heating and subsequently cooling a cover or lid thereof along a precise temperature profile comprising, in combination, a heater cap of low specific heat and mass to provide low thermal hysteresis and rapid response having a high thermal diffusivity surface configured to encompass and overlie the package lid or cover, means for electrically heating said cap capable of furnishing heat thereto at a rate at least as great as the steepest desired temperature increase rate, and heat sink means thermally associated with said cap for withdrawing heat therefrom of at least as fast a rate as the steepest desired temperature decrease rate to provide natural response times at least as rapid as the desired temperature profiling and enable the instantaneous temperature and rate of temperature change to be completely, accurately and repeatedly controlled and profiled.

14. Heater means defined in claim 13 wherein said heat sink means comprises a generally elongated thermally conductive member and fluid means for cooling said member circulated in close proximity and thermal communication with the upper end portion thereof and further comprising a flange portion extending generally laterally outwardly adjacent the lower end portion of said elongated member, said cap being secured with said lower end portion, and wherein said heating means electrical resistance means disposed and tightly clamped between said cap and said flange and electrically insulated therefrom.

15. A nest assembly for supporting packages, such as small flat packages utilized for enclosing electrical devices against a heat transfer surface to heat seal a cover or lid thereon comprising, in combination, a nest seat provided with a generally constant curvature concave recess in the upper end surface thereof, a nest having an upper surface configured complementary the bottom of such package and a lower end portion comprising a generally constant curvature convex surface complementary said concave recess and freely supported therein to permit rocking of the package and nest for alignment with the heat transfer surface, guide means for supporting said nest seat and enabling generally vertical movement thereof, and means for biasing said nest seat generally upwardly operatively associated with said guide to provide a uniform compression through the package, the lid or cover thereof, and the heat transfer surface even in the presence of deviations and irregularities among the packages.

16. Nest defined in claim 15 wherein said nest seat is supported generally vertically by a generally vertically slidably mounted guide and, said biasing means comprises a compression spring disposed beneath said guide and a screw threaded member extending generally downwardly thereof with the lower end portion of said threaded member engaging the upper end portion of said compression spring and the upper end portion of said threaded member extending through a mating screw threaded generally vertically extending aperture in said guide to enable adjustment of the upward bias from above said guide.

17. Apparatus for sealing packages such as flat packages utilized to enclose electronic devices, the apparatus comprising, in combination, heat transfer surface means having a low mass and specific heat to provide low thermal hysteresis and a high thermal diffusivity layer on the underside thereof for overlying and encompassing the lid or cover of such packages in closely coupled conductive heat transfer relationship therewith so that the temperatures thereof will remain substantially equal, means for withdrawing heat from said heat transfer surface means at a rate greater than the fastest desired cooling rate of the package seal and selectively furnishing heat thereto to enable rapid and accurate cycling and programming of said surface along a reproducible and repeatable profile of temperature and means for positioning such packages to be sealed in heat transfer relationship with said heat transfer surface means.

18. Apparatus defined in claim 17 wherein said heat furnishing means comprises feedback controlled electrical resistance heater means closely thermally coupled with said surface.

19. Apparatus defined in claim 17 further comprising self-aligning, upwardly spring biased nest means for supporting the package substantially uniformly along substantially the entire lower side thereof against said heat transfer surface, and means for withdrawing heat from said nest means to provide reproducible and repeatable heat sink conditions to the lower side of the packages so that reproducible and repeatable temperature gradients may be provided.

20. Method of heat sealing lids or covers on flat packages, such as packages utilized to enclose electronic components, the method comprising, at least the steps of, positioning such packages with the cover or lid thereof generally uppermost subjacent and in substantially uniform contact with a surface presenting a reproducible and repeatable profile of elevated temperatures generally uniformly thereacross and thereby applying heat to the seal region of such package from generally upwardly thereof to reduce convective heat transfer within the packages, supporting the opposite side of such package from beneath in substantially uniform heat transfer contact with a surface presenting a substantially uniform heat drain to reduce the temperature of such package beneath the seal region to regulate the temperature gradient vertically through the package and enable effectuation of a seal at such region with a minimum of heating of the lower portion of the package.

21. Method defined in claim 20 further comprising at least the additional steps of, heating such elevated temperature surface along a programmed increasing temperature profile, maintaining the temperature at a predetermined temperature for a predetermined time and regulating the cooling off to correspond to a programmed decreasing temperature profile.

22. Method of heat sealing lids or covers on flat glass packages, such as packages utilized to enclose electronic components, the method comprising, at least the steps of, positioning such packages with the covers or lids in substantially uniform contact with a heat transfer surface having high thermal diffusivity, heating the heat transfer surface along a programmed increasing temperature profile to a sealing temperature, holding the heat transfer surface at such sealing temperature for a specified dwell period, and cooling the heat transfer surface along a programmed decreasing temperature profile.

23. Apparatus defined in claim 12 wherein said selective lowering and retraction means comprises a side edge portion of said intermediate plate having a generally upwardly and inwardly extending oblique camming surface, a piston slidably mounted with said base block for generally horizontal movement towards and away from said intermediate plate camming surface and provided with a complementary obliquely extending camming surface adjacent one end portion thereof adapted to engage the intermediate plate camming surface upon movement of said piston towards said intermediate plate to cause lowering thereof to move said guide and nest assemblies downwardly against said biasing means, fluid conduit means for providing fluid pressure to the opposite end of said piston to move said piston towards said intermediate plate.

24. Apparatus for sealing packages such as flat packages utilized to enclose electronic devices, the apparatus comprising, in combination, means for heating the lids or covers of such packages from above along a reproducible, repeatable and rapidly variable profile of temperatures and means for cooling the bottom of such packages during such heating to increase the temperature gradient therethrough and reduce internal heating thereof.

25. Apparatus defined in claim 24 wherein said means for heating comprises a heat transfer surface for contact with the lids or covers and said means for cooling comprises a nest for supporting the package having an upper heat transfer surface for contact with the underside of such packages.

References Cited
UNITED STATES PATENTS

| | | | |
|---|---|---|---|
| 3,244,497 | 4/1966 | Copeland | 65—162 |
| 3,299,502 | 1/1967 | Wanesky | 29—464UX |
| 3,310,392 | 3/1967 | Rhodes | 65—32X |

ARTHUR D. KELLOGG, Primary Examiner

U.S. Cl. X.R.

29—25.16, 25.19, 498; 65—58, 155, 162